Sept. 15, 1925.

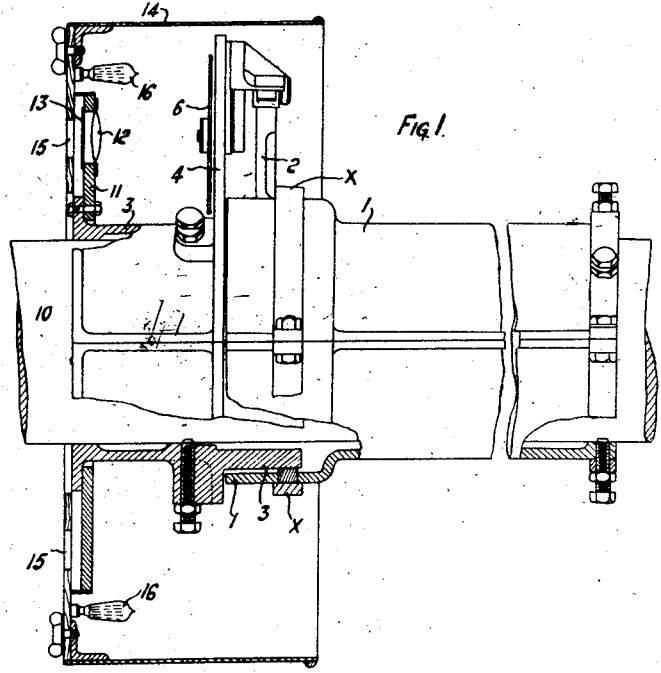
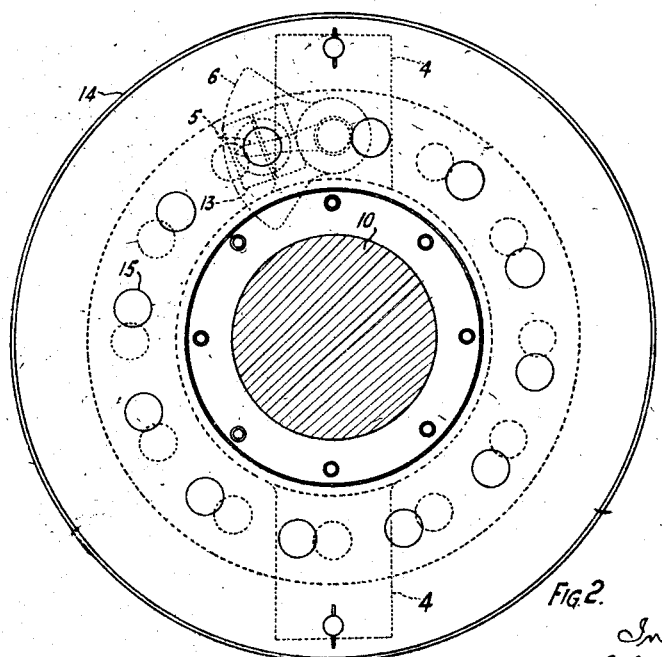

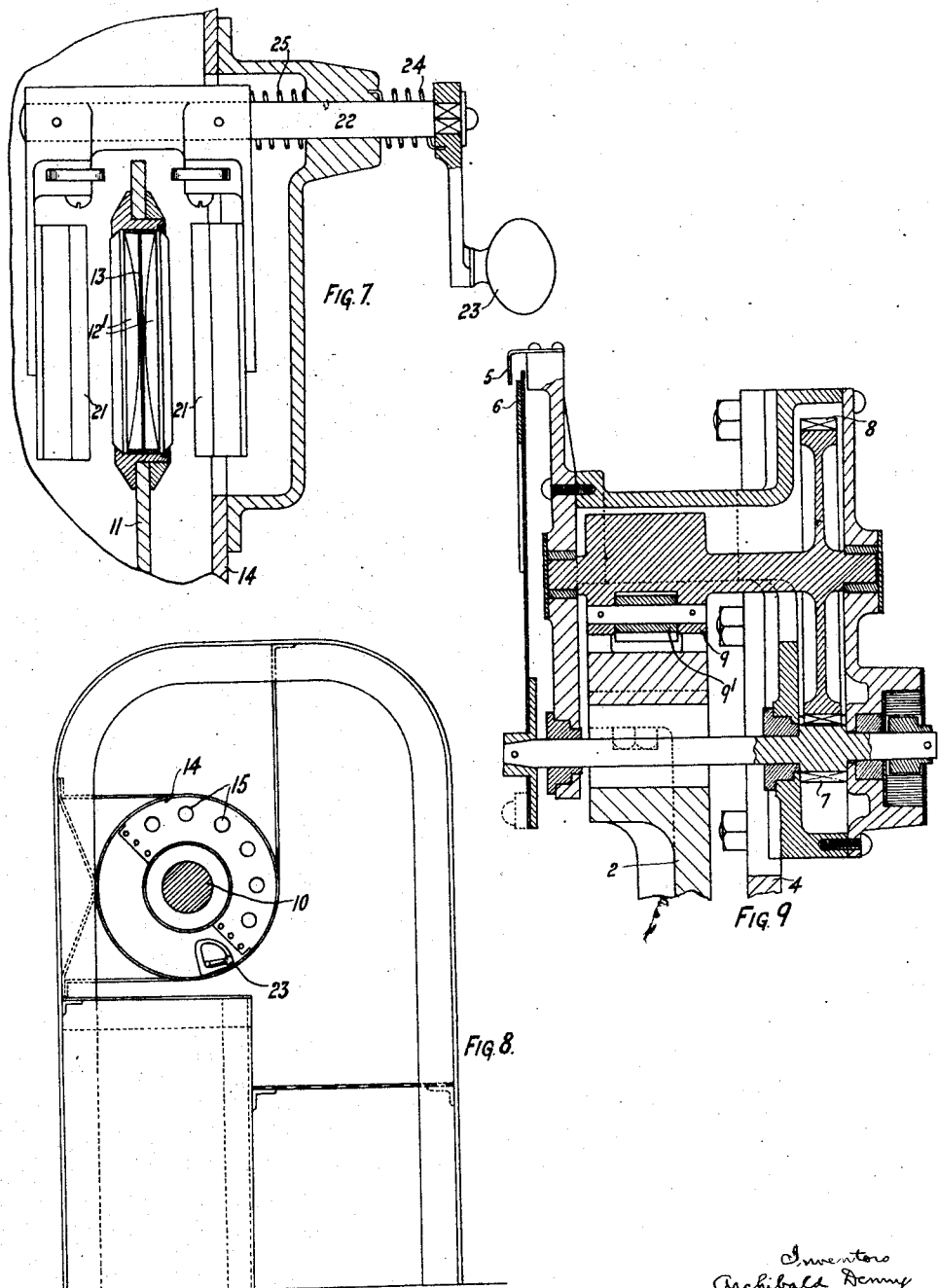

A. DENNY ET AL 1,553,755

TORSIONMETER

Filed June 16, 1924    5 Sheets-Sheet 5

Patented Sept. 15, 1925.

1,553,755

UNITED STATES PATENT OFFICE.

ARCHIBALD DENNY, OF WIMBLEDON, ENGLAND, AND FREDERICK THOMAS EDGECOMBE, OF DUNOON, SCOTLAND.

TORSIONMETER.

Application filed June 16, 1924. Serial No. 720,358.

*To all whom it may concern:*

Be it known that we, Sir ARCHIBALD DENNY and FREDERICK THOMAS EDGECOMBE, both subjects of the King of Great Britain and Northern Ireland, and residing at Wimbledon, Surrey, England, and Dunoon, Argyllshire, Scotland, respectively, have invented a certain new and useful Improvement in Torsionmeters, of which the following is a specification.

This invention relates to torsion meters of the type comprising a sleeve mounted co-axially with the shaft of which the torsion is to be measured, one end of the sleeve being free and the other end attached rigidly to the shaft, a short sleeve or stump adjacent to the free end of the first sleeve, the second sleeve or stump being co-axial with, and rigidly attached to, the shaft adjacent to the free end of the first sleeve, and measuring and indicating means to determine the relative angular motion of the sleeves.

In the interest of brevity and clearness the first sleeve is hereinafter simply designated "the sleeve" and the second sleeve is designated "the stump."

In the torsion meter according to the invention the sleeve and the stump, the adjacent ends of which are arranged in spigot and faucet relation, are provided with arms on one of which, say an arm attached to the stump, is mounted a measuring and indicating device comprising a relatively movable pointer and scale, the pointer or the scale being connected through suitable motion-magnifying gear to a member carried by a projecting arm of the sleeve. To permit the position of the pointer on the scale to be conveniently read notwithstanding that the indicating device rotates with the shaft, at a suitable distance from the pointer and scale there is attached to the stump (or to the sleeve) a disc in which is formed an aperture in register with the pointer and scale in axial direction. The aperture is occupied by a magnifying lens, or system of lenses, such that the scale is in the focal plane.

In the line of vision is preferably located a diaphragm rotatable with the shaft and formed with an opening which may be in the form of a radial slot. Desirably the indicating device is so located that the pointer tip or scale moves approximately radially of the shaft so that the relative travel of the free end of the pointer and the scale in either direction from mid-position is approximately in the direction of the slot through which the pointer and scale are viewed; or the slot may be curved to suit the curvature of the scale or the curved path traced by the tip of the pointer.

Particular attention is called to the circumstance that for reading the indications the provision of a narrow slot, which would permit only a small amount of illumination to reach the observer's eye, is not necessary. On the other hand, it has been found by experiment that it is possible to read the indications on the moving scale without the interposition of any diaphragm whatsoever. Thus, actual vision of the scale lasts over a much longer period than with stroboscopic devices in which an object is viewed through a narrow fast-moving slot; consequently a relatively great amount of illumination reaches the eye of the observer, materially aiding him in taking observations.

The scale, pointer, motion-magnifying gear, lens etc., may be enclosed in a stationary housing surrounding the shaft and provided with a number of inspection apertures arranged at suitable angular distances apart.

Observations taken at each inspection aperture in the housing give the torsion at the relative angular position. Thus, where cyclic variations of torsion occur, such variations may be determined by taking successive readings through the various inspection apertures. The housing may include an angularly adjustable wall fitted with an eye-piece so that readings of torsion may be taken corresponding to any angular position of the shaft. To afford facilities for reading at positions of the scale through a range of 360° where the shaft is in a constricted space, as in a tunnel, provision may be made for reading in both axial directions, in which case two indicating devices are provided, one being diametrically opposite the other and facing in the reverse direction. A group of inspection apertures at each end of the housing extending over a range of 180° will thus suffice for torsion readings throughout the complete range of 360°.

In the drawings Fig. 1 is a part section part elevation of one embodiment of the invention and Fig. 2 is a part sectional view at right angles to Fig. 1. Fig. 3 is a fragmentary section of a modified construction of the spigot and faucet members of the stump and sleeve, and Fig. 4 is a section on the line 4—4 of Fig. 3.

Fig. 7 is a fragmentary section of the housing showing a device for wiping the external surfaces of the lenses.

Fig. 8 is a view showing the arrangement of a propeller shaft with housing etc., in a tunnel.

Fig. 9 is a detail view corresponding substantially to Fig. 5 showing the scale, pointer and motion-magnifying gear as arranged when the pointer and scale are viewed in the opposite axial direction.

Figure 10:
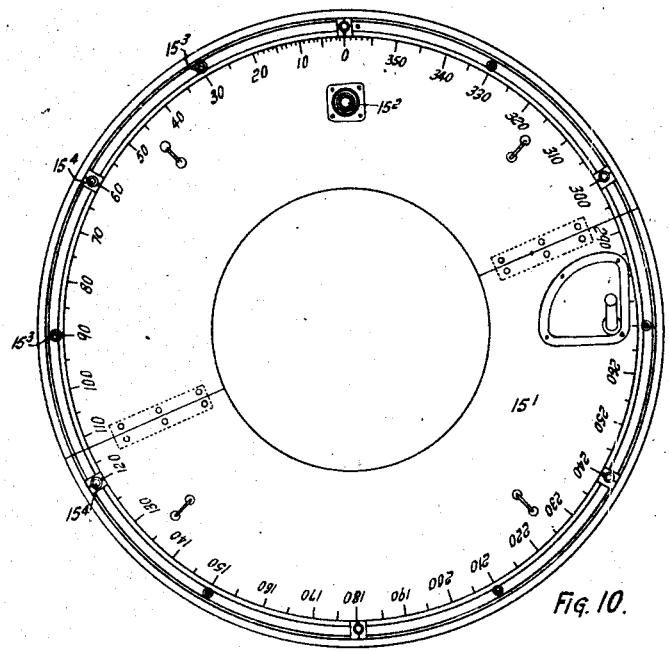
Figure 11:
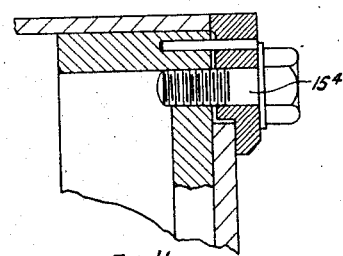
Figure 12:
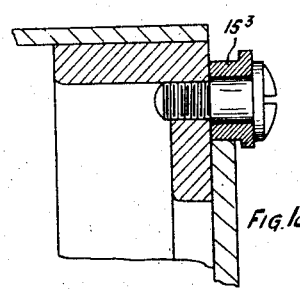

Fig. 10 is an end view showing a disc constituting an angularly adjustable end wall of the housing fitted with an eye-piece. Fig. 11 is a detail view showing means for clamping the disc in its position of adjustment. Fig. 12 is a detail view showing one of several bearing rollers engaged by the edge of the disc.

Figure 5:
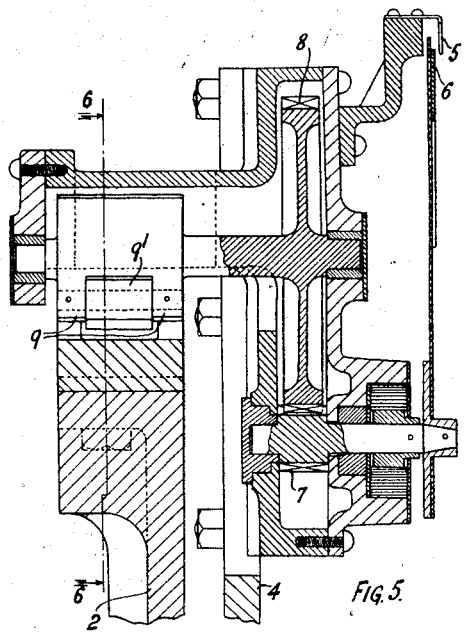
Fig. 5 is a detail view showing in section the actuating mechanism for a modified form of indicating device and Fig. 6 is a section on the line 6—6 of Fig. 5.
Figure 6:
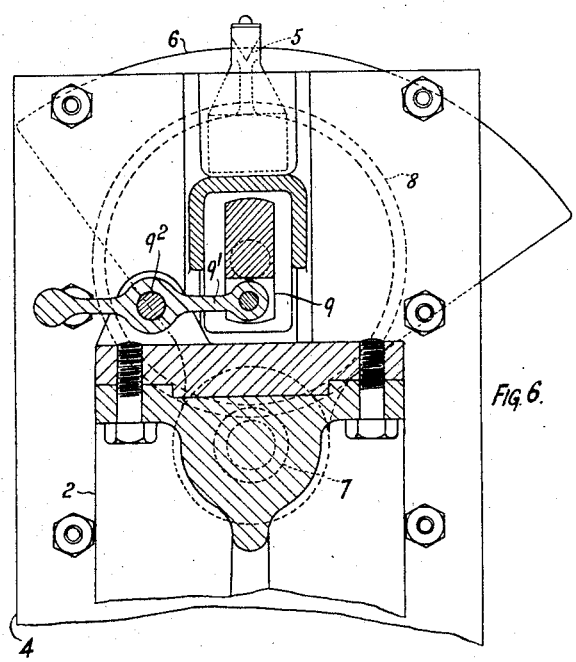

As shown, the sleeve 1 is provided with an arm 2 and the stump 3 with an arm 4. The arm 4 carries the indicating device comprising a relatively movable pointer 5 and scale 6, of which the pointer may be moved angularly over the scale (Figs. 1 and 2) or the scale may move behind the pointer (Figs. 5, 6 and 9). (Figs. 5 and 7 show the pointer on a diameter in the plane of the paper, whereas in a showing of the preferred construction the pointer would be on a diameter perpendicular to the plane of the paper).

As shown in Figs. 5 and 6, the scale 6 is operatively connected through motion-magnifying gear including gears 7 and 8 to a crank 9 sustained by a lever 9' fulcrumed at $9^2$ on the arm 2, so that the angular displacement of the scale 6 relatively to the pointer 5 is considerably greater than the relative angular displacement of the stump and sleeve.

The measuring and indicating device is so contrived that as far as possible like parts will serve for devices to be viewed in opposite axial directions, the spindle of the gear 7 and the bearings for such spindle as shown in Fig. 5 being replaced by the corresponding elements shown in Fig. 9, an aperture or slot being formed in the arm 2 to permit the small circumferential motion of the spindle of the gear wheel 7 which occurs during the functioning of the apparatus.

To permit convenient reading of the position of the pointer 5 on the scale notwithstanding that the indicating device rotates with the shaft 10, at a suitable distance from the indicating device there is attached to the stump 3 a disc 11 in which is formed an aperture in register with the pointer 5 and scale 6 in axial direction. The aperture is occupied by a simple lens 12 (Fig. 1) or a compound lens 12' (Fig. 7), the focal length of which is the distance between the lens and the scale 6. In the line of vision is interposed a diaphragm 13 rotatable with the shaft 10 and formed with an opening which may be in the form of a radial slot, as explained above.

The scale 6, pointer 5, motion-magnifying gear 7, 8, 9, 9', lens 12 or 12' and diaphragm 13 are enclosed in a stationary housing 14 surrounding the shaft 10 and provided with a number of inspection apertures 15 arranged at suitable angular distances apart, the group of apertures 15 extending over a range of 180° as shown in Fig. 8. The interior of the housing is illuminated by electric lamps 16 fitted to the housing, no slip rings or other movable connections being necessary.

The position of the pointer 5 on the scale 6 may be read by an observer positioning his eye at any one of the inspection apertures 15; the pointer and the scale, being in the focal plane of the lens, appear immovable while any part of the lens is opposite the observer's eye.

As shown in Fig. 10, the housing may include an angularly adjustable end wall 15' provided with an eye-piece $15^2$, said wall being constituted by a disc the edge of which engages rollers $15^3$, a pin $15^4$ serving to clamp the disc in its position of adjustment.

The sleeve 1 and stump 3 are made in halves, divided longitudinally for easy erection on the shaft 10, and at the adjacent ends, which in the assembled arrangement are in spigot and faucet relation, there are provided bearing pads to minimize friction between the spigot and faucet members.

Figure 3:
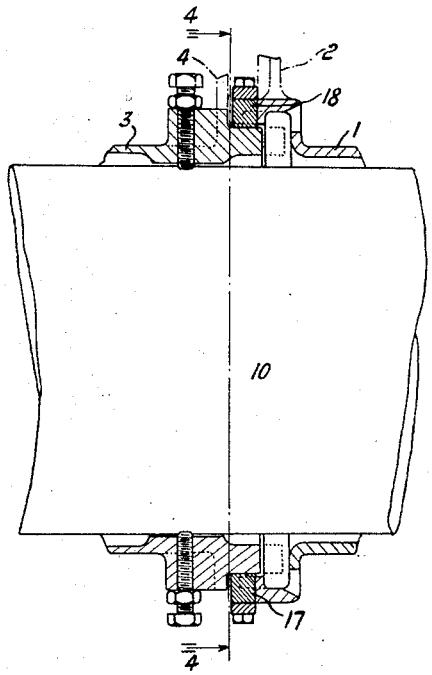
Figure 4:
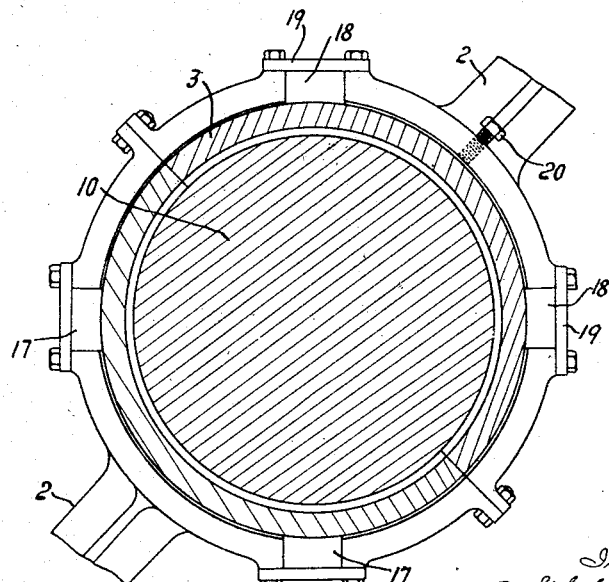

As shown in Figs. 3 and 4, each half of the sleeve 1 is provided with two pockets for the reception of pads spaced angularly 90° apart; or the pads of one half-sleeve may be fixed, the pads 17 fitted to one half sleeve, whether removable or fixed, being machined accurately to the diameter of the co-operating spigot member. In erection, the halves of the sleeve are fitted together around the shaft 10, the half with the machined pads 17 being below. A supporting screw 20 fitted to the upper half sleeve is screwed down on the stump or on the shaft whereby the sleeve 1 may be accurately centralized. Pads 18 are then fitted to the upper half sleeve and their exterior surfaces scraped until they are flush with the seats for cover plates 19 which are secured in position, the supporting screw 20 being retracted.

In Fig. 1 is shown an alternative arrangement for retaining the bearing pads in place. In this arrangement two of the pads may be fixed and the other two removable. The sleeve is provided with an external ring X slidable in axial direction. After the removable pads have been scraped down fair with the surface of the sleeve, the ring X is slid axially to cover the pads and retain them in position.

With the apparatus described applied to a propeller shaft of a ship the accuracy of reading is unaffected by longitudinal movements of the shaft or by relative movement of the axis of the shaft and the ship's framing due, for example, to distortion caused by stresses to which the ship may be subjected.

As shown in Fig. 7 there may be provided a manually controllable device for wiping the exposed lens surfaces. The device shown comprises pads 21 carried by an angularly and axially movable plunger 22 operable by a handle 23, the plunger being adapted to be brought into a position in which the pads 21 may bear on the plane faces of the plano-convex elements constituting the compound lens 12' whereby the exposed glass surfaces may be wiped, oppositely acting springs 24, 25 normally maintaining the pads 21 axially spaced from both exposed lens surfaces and out of register therewith. The plane faces of the lens elements are shown as projecting beyond the mount therefor, so that the wiping pads 21 may brush the lens surfaces during rotation without the pads 21 coming in contact with any portion of the disc 11, thus avoiding liability of picking up dirt therefrom.

What we claim is:—

1. A torsion meter comprising coaxially disposed rotary sleeves, an indicating device carried by one of said sleeves, motion-magnifying means operatively connected to the other of said sleeves and adapted to actuate said indicating device, and a lens through which said indicating device may be viewed, said lens being rotatable with said sleeves, the optical axis of said lens being parallel to the axis of rotation and intersecting said indicating device, said lens being spaced from said indicating device a distance equal to the focal length of the lens.

2. A torsion meter comprising coaxially disposed rotary sleeves, an indicating device carried by one of said sleeves, motion-magnifying means operatively connected to the other of said sleeves and adapted to actuate said indicating device, and a lens carried by one of said sleeves to rotate therewith, through which lens said indicating device may be viewed, the optical axis of said lens being parallel with the axis of rotation, said lens spaced from said indicating device a distance equal to the focal length of the lens.

3. A torsion meter comprising coaxially disposed rotary sleeves, an indicating device carried by one of said sleeves, motion-magnifying means operatively connected to the other of said sleeves and adapted to actuate said indicating device, a lens rotatable with said sleeves, through which lens said indicating device may be viewed, the optical axis of said lens being parallel with the axis of rotation, said lens spaced from said indicating device a distance equal to the focal length of the lens, and a diaphragm also rotatable with the sleeves and having a slot intersected by the optical axis of said lens.

4. A torsion meter comprising coaxially disposed rotary sleeves, an indicating device carried by one of said sleeves, motion-magnifying means operatively connected to the other of said sleeves and adapted to actuate said indicating device, a lens rotatable with said sleeves, through which lens said indicating device may be viewed, the optical axis of said lens being parallel with the axis of rotation, said lens spaced from said indicating device a distance equal to the focal length of the lens, and a diaphragm also rotatable with the sleeves and having a slot intersected by the optical axis of said lens and extending in the general direction of movement of said indicating device.

5. A torsion meter comprising coaxially disposed rotary sleeves, an indicating device carried by one of said sleeves, motion-magnifying means operatively connected to the other of said sleeves and adapted to actuate said indicating device, a lens rotatable with said sleeves, through which lens said indicating device may be viewed, and a stationary housing surrounding said sleeves, indicating device and lens, and having angularly spaced inspection apertures.

6. A torsion meter comprising coaxially disposed rotary sleeves, an indicating device carried by one of said sleeves, motion-magnifying means operatively connected to the other of said sleeves and adapted to actuate said indicating device, a lens rotatable with said sleeves, through which lens said indicating device may be viewed, and a housing surounding said sleeves, indicating device and lens, said housing including an angular adjustable apertured end wall.

7. A torsion meter comprising coaxially disposed rotary sleeves, two indicating devices carried by one sleeve one at each end thereof, said devices located on opposite sides of a diameter, motion-magnifying means operatively connected to the other of said sleeves and adapted to actuate said indicating devices, and a housing enclosing said sleeves and indicating devices and having at each end thereof angularly spaced inspection apertures extending over a range of about 180°.

8. A torsion meter for shafts comprising a sleeve fixed at one end to said shaft and free at the other end, a second sleeve fixed to said shaft and disposed in spigot and faucet relation to the free end of the first sleeve, said sleeves being made in halves, bearing pads interposed between the adjacent ends of said sleeves, an indicating device carried by one sleeve, motion-magnifying means operatively connected to the other sleeve and adapted to actuate said indicating device, and an optical device rotatable with said sleeves for viewing said indicating device.

9. A torsion meter comprising coaxially disposed rotary sleeves, an indicating device carried by one sleeve, motion-magnifying means operatively connected with the other sleeve and serving to actuate said indicating device, a lens system rotatable with said sleeves for viewing said indicating device, and means for wiping the exposed lens surfaces.

In testimony whereof we have signed our names to this specification.

ARCHIBALD DENNY.
FREDERICK THOMAS EDGECOMBE.